(12) United States Patent
Liang et al.

(10) Patent No.: US 7,742,242 B2
(45) Date of Patent: Jun. 22, 2010

(54) LENS SYSTEM

(75) Inventors: Kuo-Yen Liang, Taipei Hsien (TW);
Chun-Hsiang Huang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/344,261

(22) Filed: Dec. 25, 2008

(65) Prior Publication Data
US 2010/0020419 A1    Jan. 28, 2010

(30) Foreign Application Priority Data
Jul. 23, 2008    (CN) ................... 2008 1 0302941.5

(51) Int. Cl.
*G02B 9/12*    (2006.01)
(52) U.S. Cl. ..................... 359/791; 359/754

(58) Field of Classification Search ............... 359/791, 359/738, 754–756, 760, 763, 767–769, 779
See application file for complete search history.

(56) References Cited

U.S. PATENT DOCUMENTS

| 6,795,253 | B2* | 9/2004 | Shinohara | 359/716 |
| 6,987,625 | B2* | 1/2006 | Nakamura | 359/791 |

* cited by examiner

*Primary Examiner*—Darryl J Collins
(74) *Attorney, Agent, or Firm*—Zhigang Ma

(57) ABSTRACT

A lens system includes, in order from the object side, a positive refractive power first lens, a positive refractive power second lens; and a negative refractive power third lens. Wherein the lens system satisfies the following conditions: (1) $(|G1R2|-G1R1)/(|G1R2|+G1R1)<0.5$; and (2) $0.2<G1R1/F<0.6$, wherein, G1R1 is the radius of curvature of a surface of the first lens facing the object side of the lens system, G1R2 is the radius of curvature of the surface of the first lens facing the image side of the lens system, and F is a focal length of the lens system.

18 Claims, 10 Drawing Sheets

LENS SYSTEM

TECHNICAL FIELD

The present disclosure relates to a lens system and, particularly, to a compact lens system having a small number of lens components and short overall length.

DESCRIPTION OF THE RELATED ART

Conventionally, there is a technical field of lenses where a short overall length is demanded for use in lens modules for image acquisition that are mounted in relatively compact equipment, such as simple digital cameras, webcams for personal computers, and portable imaging systems in general. In order to satisfy this demand, conventional imaging lenses have been formed using a one-piece lens construction. Until now, the electronic image sensing chips used with the lens modules have been compact and have low resolution, maintaining a small image size on the image sensing chips and miniaturizing the lens systems with a small number of lens components. In those arrangements, although using one-piece lens construction, aberrations have been at an acceptable level because the incident angle of light rays onto the image sensing chip is usually not so large as to let the aberrations be noticeable.

However, nowadays, because the resolution and the size of the image sensing chips have increased, aberrations occurring in one-piece lenses are now too noticeable in use with the improved images sensing chips. Therefore, it is necessary to develop a lens system with a short overall length and an optical performance that matches image sensing chips with enhanced resolution and size.

What is needed, therefore, is a lens system with a short overall length and with relatively good optical performance.

BRIEF DESCRIPTION OF THE DRAWINGS

Many aspects of the present lens system can be better understood with reference to the following drawings. The components in the drawings are not necessarily drawn to scale, the emphasis instead being placed upon clearly illustrating the principles of the present lens system. Moreover, in the drawings, like reference numerals designate corresponding parts throughout the several views.

DETAILED DESCRIPTION OF THE EMBODIMENTS

Embodiments of the present disclosure will now be described in detail below, with references to the accompanying drawings.

Figure 1:
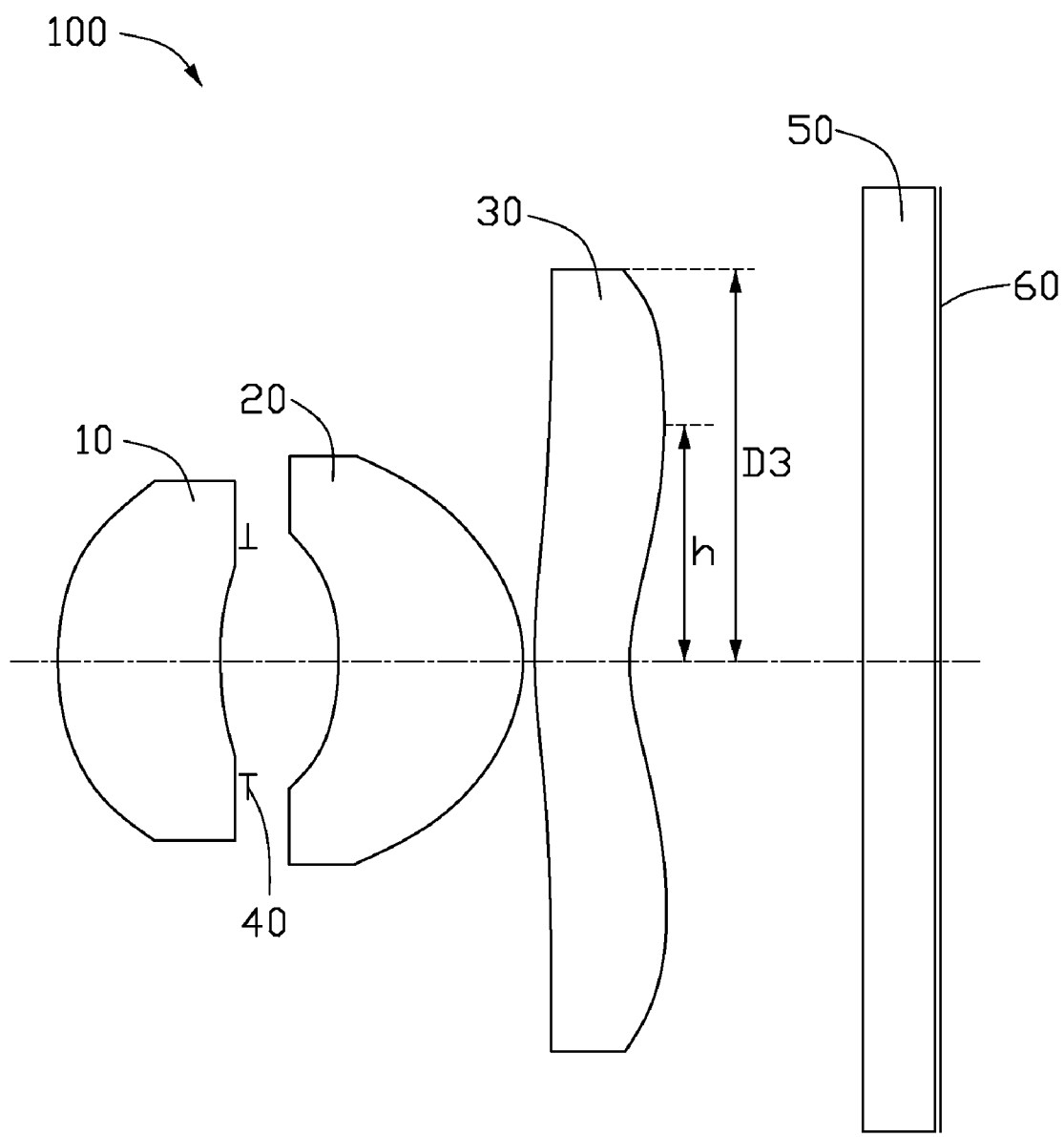
FIG. 1 is a schematic view of a lens system according to an embodiment.

Referring to FIG. 1, a lens system 100, according to an embodiment, is shown. The lens system 100 includes, in order from the object side to the image side, a positive refractive power first lens 10, a positive refractive power second lens 20, and a negative refractive power third lens 30. The lens system 100 can be used in digital cameras, mobile phones, personal computer cameras and so on. The lens system 100 can be used for capturing images by disposing an image sensor at an image plane 60 of the lens system 100.

In the present embodiment, the first lens 10 is a meniscus-shaped lens with a convex surface facing the object side of the lens system 100 and the two surfaces of the first lens 10 are aspherical. The second lens 20 is a meniscus-shaped lens with a convex surface facing the image side of the lens system 100 and the two surfaces of the second lens 20 are aspherical. The third lens 30 has a convex surface facing to the object side of the lens system 100 and a concave surface facing to the image side of the lens system 100, and the two surfaces of the third lens 30 are aspherical.

In order that the lens system 100 has a short overall length and low spherical aberration and coma, the lens system 100 satisfies the following conditions:

$$(|G1R2|-G1R1)/(|G1R2|+G1R1)<0.5; \qquad (1) \text{ and}$$

$$0.2<G1R1/F<0.6, \qquad (2)$$

wherein, G1R1 is the radius of curvature of a surface of the first lens 10 facing the object side of the lens system 100, G1R2 is the radius of curvature of the surface of the first lens 10 facing the image side of the lens system 100, and F is a focal length of the lens system. The first condition (1) together with the second condition (2) are configured for limiting the overall length of the lens system 100 and decreasing spherical aberration and coma of the lens system 100 by limiting the structure of the first lens 10 and providing the relationship between the overall length of the lens system 100 and the structure of the first lens 10.

In order that the lens system 100 has a better optical performance, the lens system 100 also satisfies the following conditions:

$$1<F1/F<1.5; \qquad (3)$$

$$1<F/G3R2<7; \qquad (4) \text{ and}$$

$$0.5<h/D3<0.7, \qquad (5)$$

wherein, F1 is a focal length of the first lens 10, G3R2 is the radius of curvature of a surface of the third lens 30 facing the image side of the lens system 100, D3 is the effective lens radius of the third lens 30, and h is the distance from the optical axis to a point on the image-side surface of the third lens 30 farthest from the first lens 10. The third condition (3) is for decreasing spherical aberration of the lens system 100 by limiting the relationship between the focal length of the first lens 10 and the focal length of the lens system 100. The fourth condition (4) and the fifth condition (5) are for decreasing spherical aberration and coma of the lens system 100 by limiting the structure of the third lens 30.

The lens system 100 further satisfies the following condition:

$$-1<F*F3/V3<0 \qquad (6)$$

wherein, F3 is a focal length of the third lens 30, and V3 is the Abbe constant of the third lens 30. The sixth condition (6) is for ensuring the light from an object has low chromatic aberration after transmitting through the third lens 30 to decrease the chromatic aberration of the lens system 100.

The lens system 100 further includes an aperture stop 40 and an infrared filter 50. The aperture stop 40 is arranged between the first lens 10 and the second lens 20 in order to reduce light flux into the second lens 20. For cost reduction, the aperture stop 40 may be formed directly on the surface of the first lens 10 facing the image side of the lens system 100. In practice, a portion of the surface of the first lens 10 through which light rays should not be transmitted is coated with an opaque material, which functions as the aperture stop 40. The infrared filter 50 is arranged between the third lens 30 and the image plane 60 for filtering infrared rays coming into the lens system 100.

Further, the first lens 10, the second lens 20, and the third lens 30 can be made from a resin or a plastic, which makes their manufacture relatively easy and inexpensive. In the present embodiment, the first lens 10, the second lens 20, and the third lens 30 are made of plastic.

Examples of the system will be described below with reference to FIGS. 2-10. It is to be understood that the disclosure is not limited to these examples. The following are symbols used in each exemplary embodiment.

R: radius of curvature
d: distance between surfaces on the optical axis of the system
nd: refractive index of lens
V: Abbe constant In each example, both surfaces of the first lens 10, both surfaces of the second lens 20, and both surfaces of the third lens 30 are aspheric. The shape of each aspheric surface is determined by expression 1 below. Expression 1 is based on a Cartesian coordinate system, with the vertex of the surface being the origin, and the optical axis extending from the vertex being the x-axis.

$$x = \frac{ch^2}{1 + \sqrt{1 - (k+1)c^2h^2}} + \sum A_i h^i \qquad \text{Expression 1}$$

wherein, h is a height from the optical axis to the surface, c is a vertex curvature, k is a conic constant, and Ai are i-th order correction coefficients of the aspheric surfaces.

Example 1

Tables 1 and 2 show lens data of Example 1. In the table 2, A4 to A12 are aspherical coefficients.

TABLE 1

| Lens system 100 | R(mm) | d(mm) | nd | V |
|---|---|---|---|---|
| Object side surface of the first lens 10 | 0.96 | 0.68 | 1.51 | 59 |
| Image side surface of the first lens 10 | 1.67 | 0.10 | — | — |
| Object side surface of the second lens 20 | −0.95 | 0.76 | 1.51 | 59 |
| Image side surface of the second lens 20 | −0.63 | 0.05 | — | — |
| Object side surface of the third lens 30 | 2.33 | 0.39 | 1.54 | 56 |
| Image side surface of the third lens 30 | 0.99 | 0.96 | — | — |

TABLE 2

| Surface | Aspherical coefficients |
|---|---|
| Object side surface of the first lens 10 | A4 = −0.01163; A6 = −0.00473; A8 = −0.04725; A10 = 0.157865; A12 = −0.21482 |
| Image side surface of the first lens 10 | A4 = 0.021719; A6 = −0.26165; A8 = 1.969547; A10 = −12.3018; A12 = 16.35086 |
| Object side surface of the second lens 20 | A4 = −0.39449; A6 = 0.056503; A8 = −9.45337; A10 = 22.38728; A12 = −9.95414 |
| Image side surface of the second lens 20 | A4 = 0.248875; A6 = −1.09805; A8 = 1.968643; A10 = −2.67617; A12 = 1.184367 |
| Object side surface of the third lens 30 | A4 = −0.31794; A6 = 0.232974; A8 = −0.07606; A10 = 0.01098; A12 = −0.00089 |
| Image side surface of the third lens 30 | A4 = −0.17668; A6 = 0.084412; A8 = −0.03432; A10 = 0.011891; A12 = −0.00215 |

Figure 2:
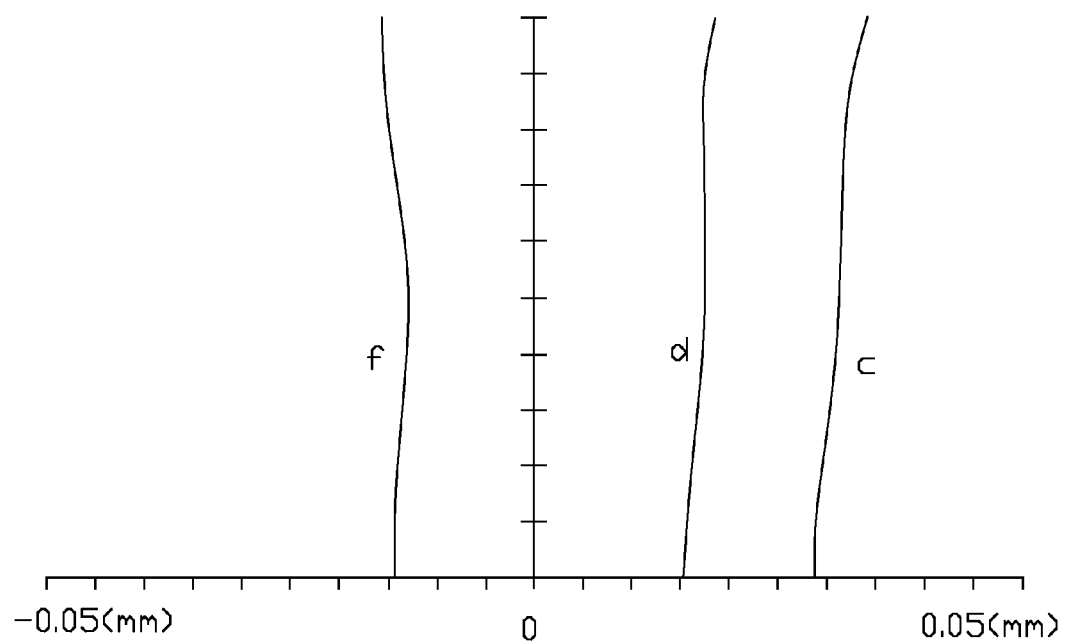
FIGS. 2-4 are graphs respectively showing spherical aberration, field curvature, and distortion for a lens system according to a first exemplary embodiment of the present disclosure.
Figure 3:
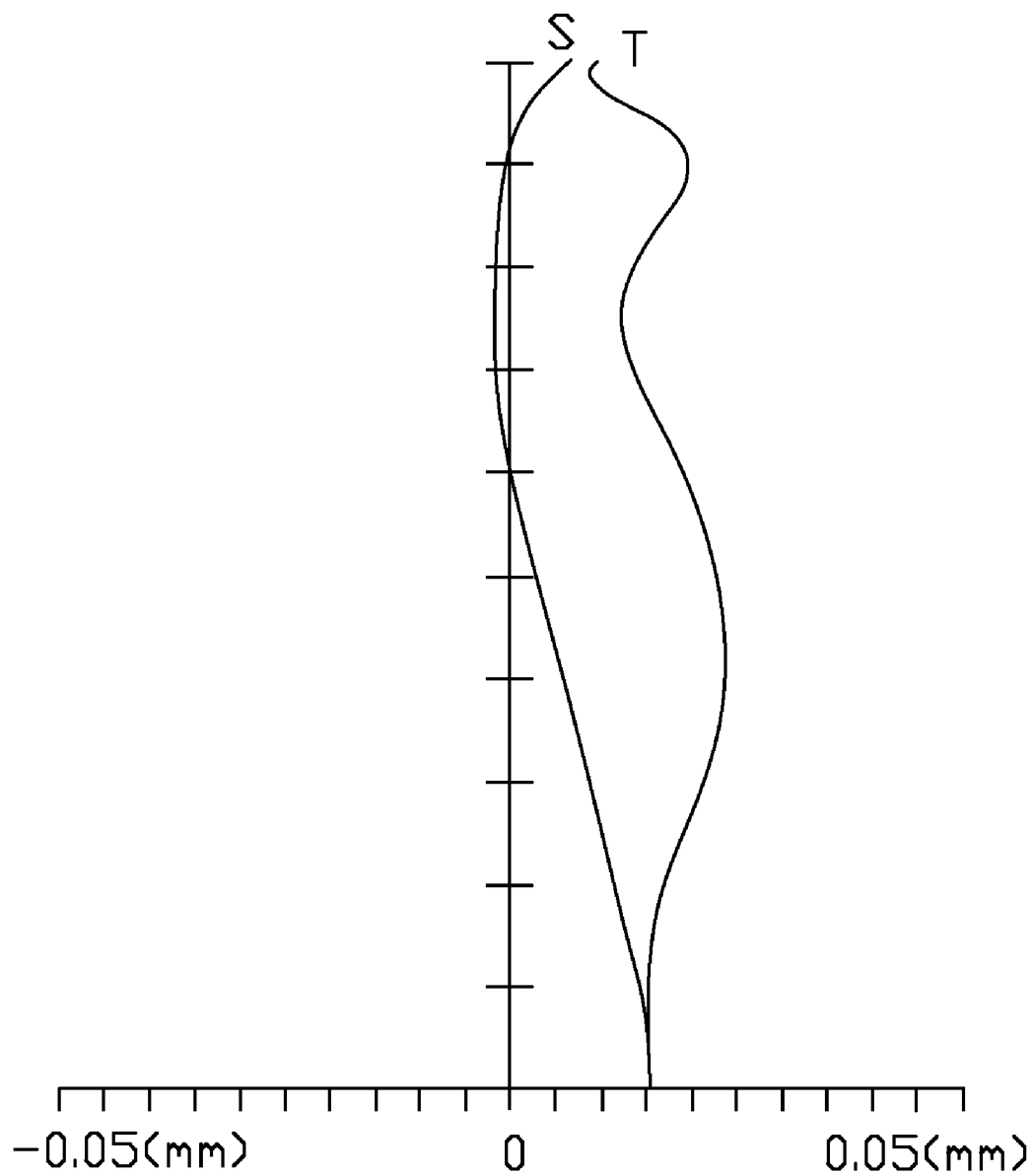
Figure 4:
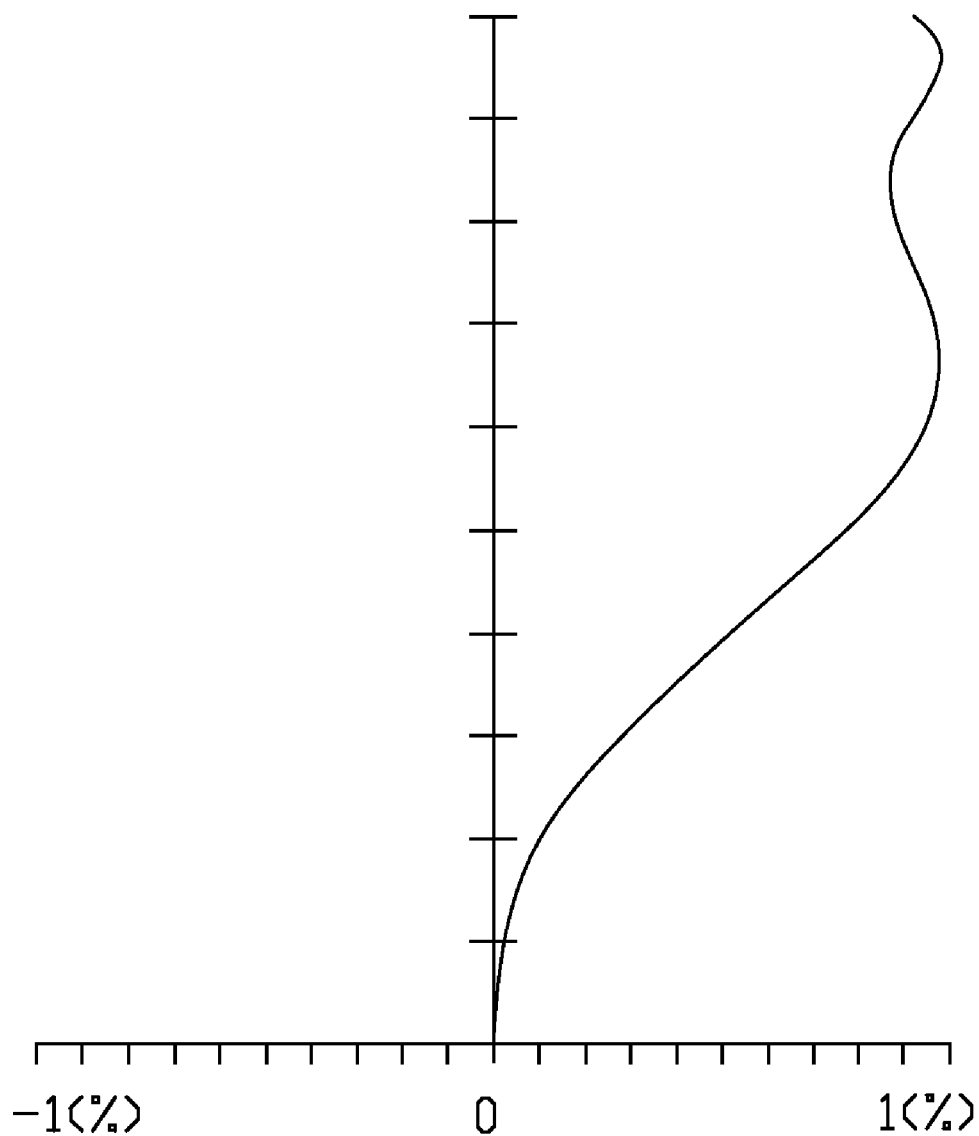

FIGS. 2-4 are graphs of aberrations (spherical aberration, field curvature, and distortion) of the lens system 100 of Example 1. In FIG. 2, the curves c, d, and f show spherical aberrations of the lens system 100 corresponding to three light wavelengths of 656.3 nm, 587.6 nm, and 435.8 nm respectively. Generally, the spherical aberration of the lens system 100 is limited to a range from about −0.05 mm to about 0.05 mm, the field curvature of the lens system 100 is limited to a range from about −0.05 mm to about 0.05 mm, and the distortion of the lens system 100 is limited to a range from about −1% to about 1%.

Example 2

Tables 3 and 4 show lens data of Example 2. In the table 4, A4 to A12 are aspherical coefficients.

TABLE 3

| Lens system 100 | R(mm) | d(mm) | nd | V |
|---|---|---|---|---|
| Object side surface of the first lens 10 | 1.04 | 0.49 | 1.54 | 57 |
| Image side surface of the first lens 10 | 1.90 | 0.17 | — | — |
| Object side surface of the second lens 20 | −1.17 | 0.80 | 1.51 | 59 |
| Image side surface of the second lens 20 | −0.64 | 0.06 | — | — |
| Object side surface of the third lens 30 | 1.70 | 0.33 | 1.60 | 28 |
| Image side surface of the third lens 30 | 0.78 | 0.99 | — | — |

TABLE 4

| Surface | Aspherical coefficients |
|---|---|
| Object side surface of the first lens 10 | A4 = −0.03064; A6 = 0.036151; A8 = −0.20414; A10 = 0.396608; A12 = −0.46626 |
| Image side surface of the first lens 10 | A4 = 0.042448; A6 = −0.22325; A8 = 1.681477; A10 = −4.60955; A12 = 0.745276 |
| Object side surface of the second lens 20 | A4 = −0.13361; A6 = −0.93862; A8 = −0.72514; A10 = 3.026682; A12 = −2.11784 |
| Image side surface of the second lens 20 | A4 = 0.337485; A6 = −1.29742; A8 = 2.109478; A10 = −2.34424; A12 = 1.00334 |
| Object side surface of the third lens 30 | A4 = −0.41794; A6 = 0.265043; A8 = −0.06234; A10 = 0.00433; A12 = −0.00354 |
| Image side surface of the third lens 30 | A4 = −0.24476; A6 = 0.13451; A8 = −0.05586; A10 = 0.017487; A12 = −0.00344 |

Figure 5:
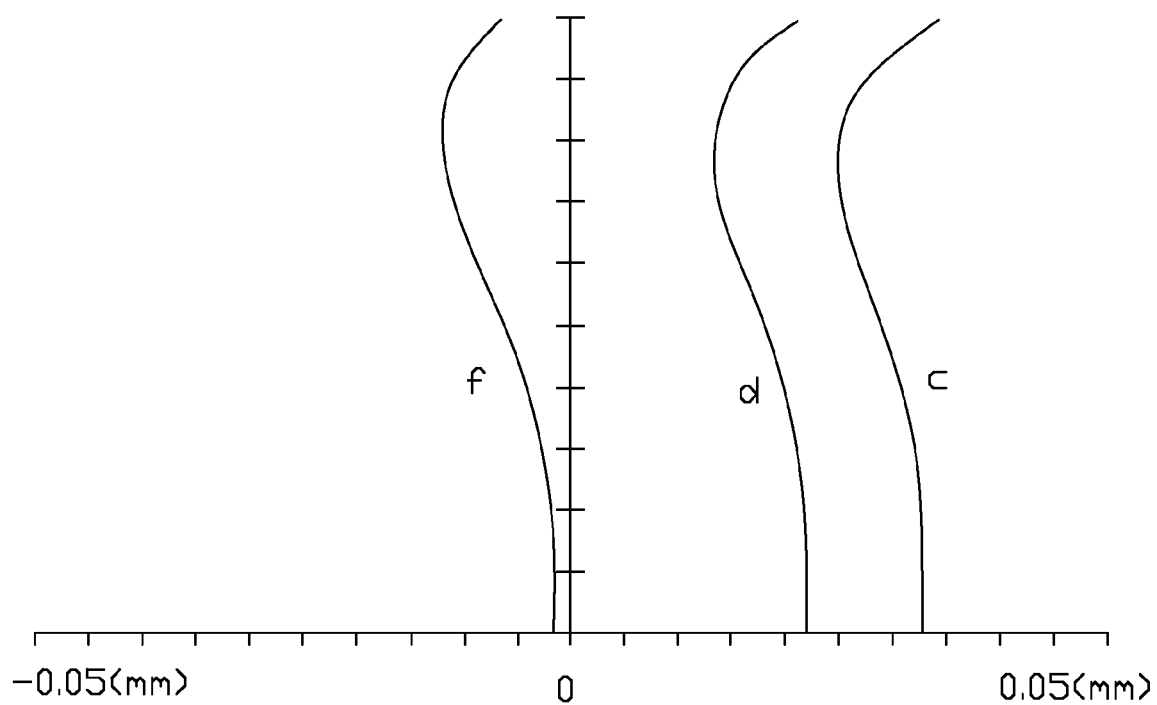
FIGS. 5-7 are graphs respectively showing spherical aberration, field curvature, and distortion for a lens system according to a second exemplary embodiment of the present disclosure.
Figure 6:
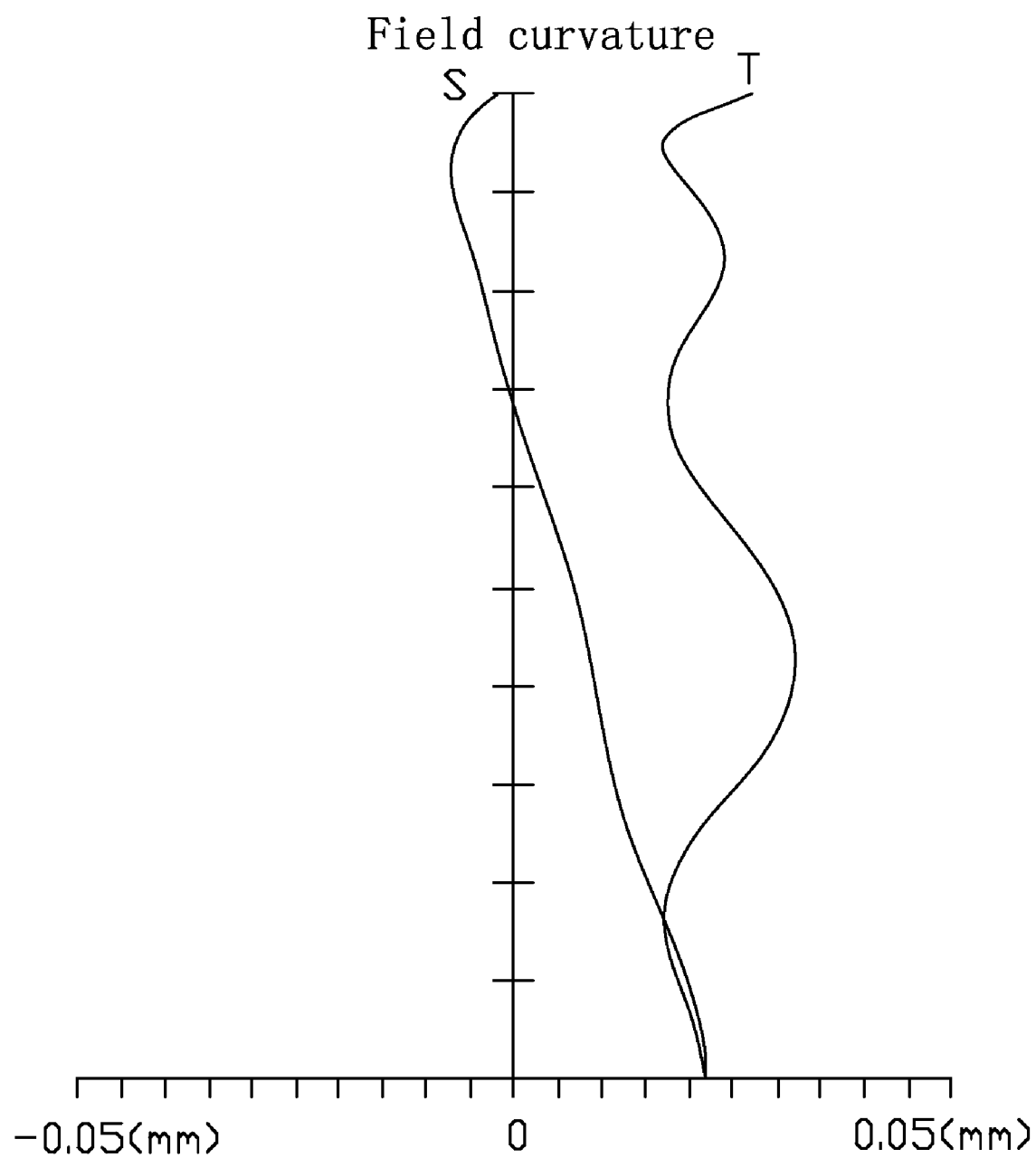
Figure 7:
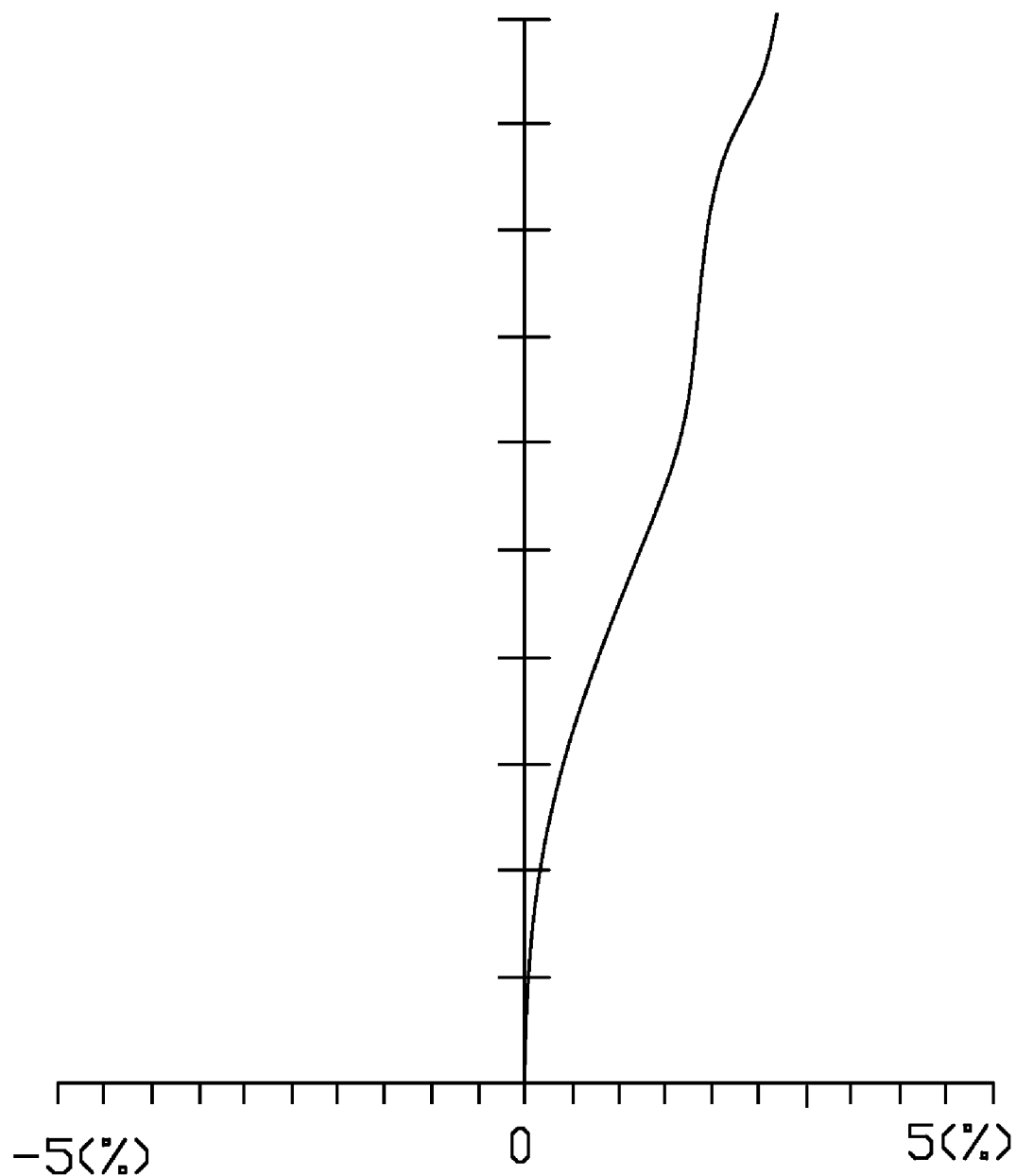

FIGS. 5-7 are graphs of aberrations (spherical aberration, field curvature, and distortion) of the lens system 100 of Example 2. In FIG. 5, the curves c, d, and f show spherical aberrations of the lens system 100 corresponding to three light wavelengths of 656.3 nm, 587.6 nm, and 435.8 nm respectively. Generally, the spherical aberration of lens system 100 is limited to a range from about −0.05 mm to about 0.05 mm, the field curvature of the lens system 100 is limited to a range from about −0.05 mm to about 0.05 mm, and the distortion of the lens system 100 is limited to a range from about −5% to about 5%.

Example 3

Tables 5 and 6 show lens data of Example 3. In the table 6, A4 to A12 are aspherical coefficients.

TABLE 5

| Lens system 100 | R(mm) | d(mm) | nd | V |
|---|---|---|---|---|
| Object side surface of the first lens 10 | 1.03 | 0.65 | 1.50 | 60 |
| Image side surface of the first lens 10 | 2.79 | 0.16 | — | — |
| Object side surface of the second lens 20 | −1.17 | 0.99 | 1.55 | 55 |
| Image side surface of the second lens 20 | −0.84 | 0.28 | — | — |
| Object side surface of the third lens 30 | 1.70 | 0.40 | 1.56 | 52 |
| Image side surface of the third lens 30 | 0.85 | 0.63 | — | — |

TABLE 6

| Surface | Aspherical coefficients |
|---|---|
| Object side surface of the first lens 10 | A4 = 0.008966; A6 = −0.03414; A8 = 0.033999; A10 = 0.028556; A12 = −0.09281 |
| Image side surface of the first lens 10 | A4 = 0.058729; A6 = −0.20342; A8 = 0.242708; A10 = −0.05294; A12 = −1.15986 |
| Object side surface of the second lens 20 | A4 = −0.33729; A6 = −0.76852; A8 = −0.61186; A10 = 5.650294; A12 = −0.43973 |
| Image side surface of the second lens 20 | A4 = −0.05857; A6 = −0.1083; A8 = 0.457942; A10 = −0.8511; A12 = 0.541781 |
| Object side surface of the third lens 30 | A4 = −0.27266; A6 = 0.205036; A8 = −0.07273; A10 = 0.014349; A12 = −0.00137 |
| Image side surface of the third lens 30 | A4 = −0.1631; A6 = 0.082852; A8 = −0.04003; A10 = 0.01177; A12 = −0.00142 |

Figure 8:
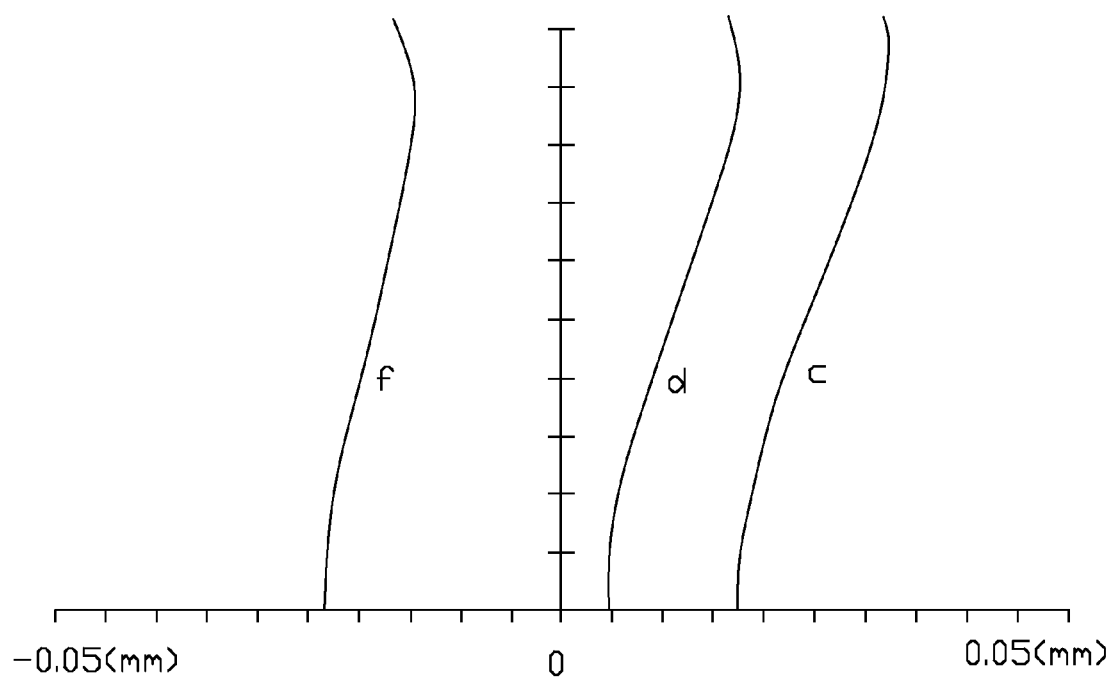
FIGS. 8-10 are graphs respectively showing spherical aberration, field curvature, and distortion for a lens system according to a third exemplary embodiment of the present disclosure.
Figure 9:
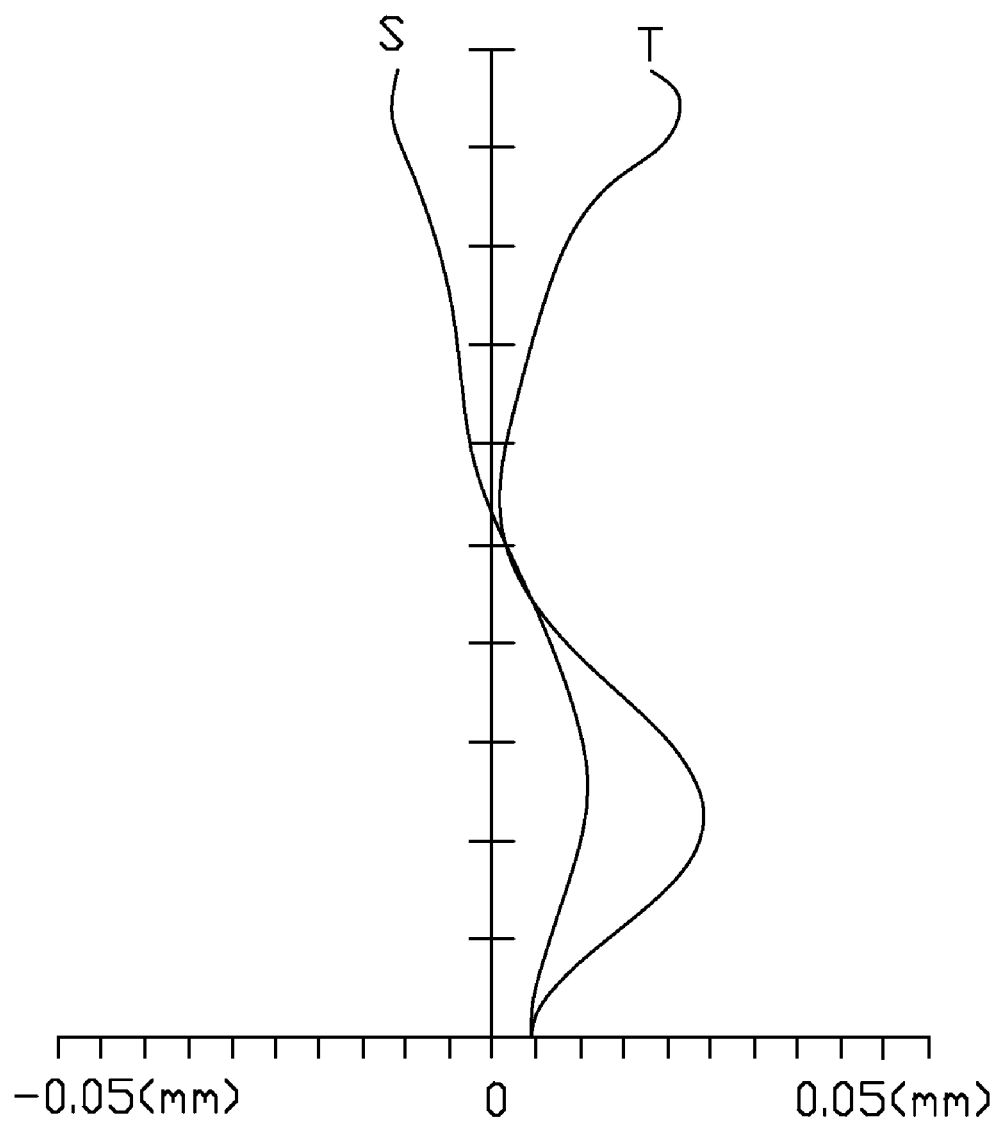
Figure 10:
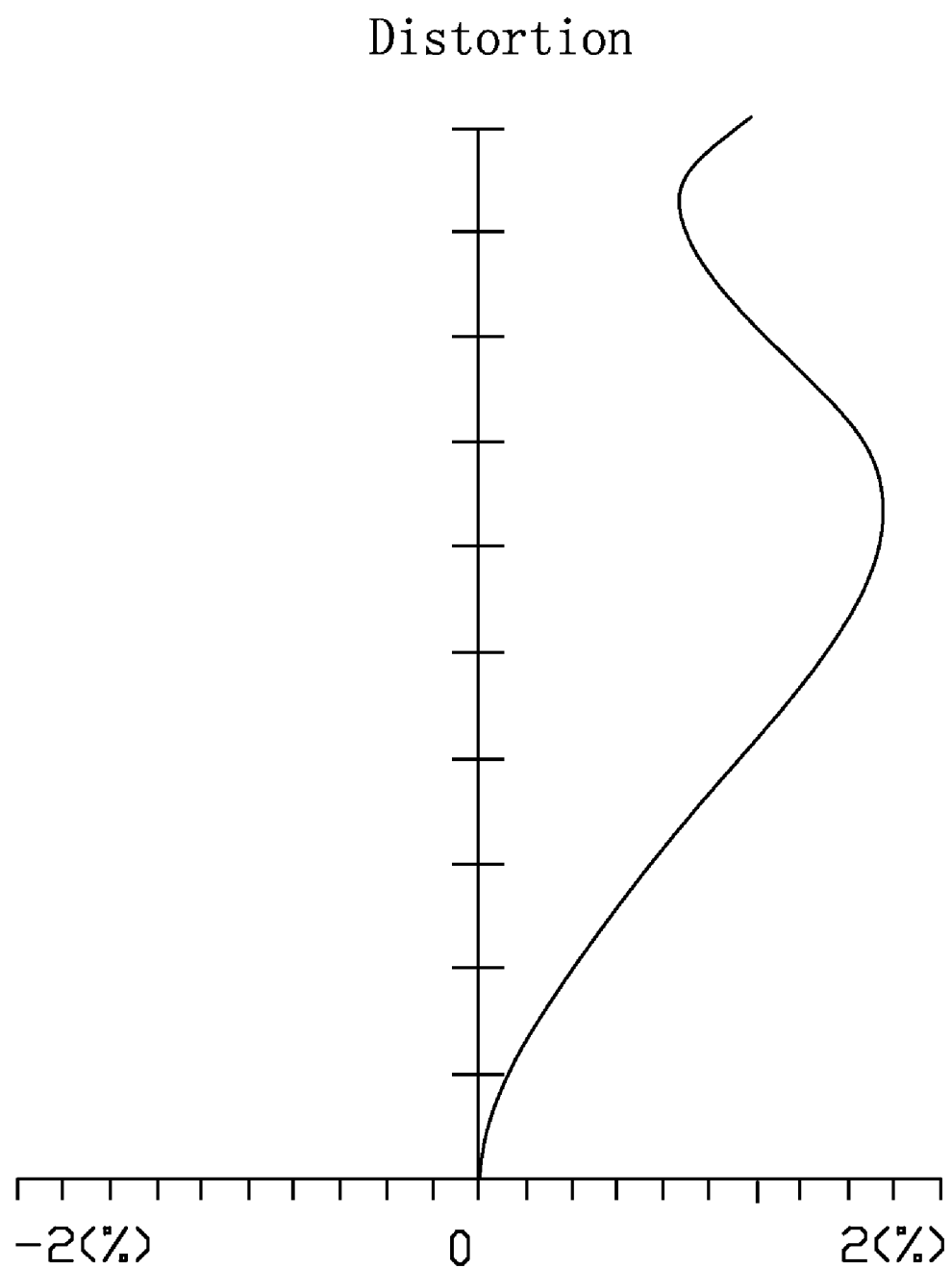

FIGS. 8-10 are graphs of aberrations (spherical aberration, field curvature, and distortion) of the lens system 100 of Example 3. In FIG. 8, the curves c, d, and f show spherical aberrations of the lens system 100 corresponding to three light wavelengths of 656.3 nm, 587.6 nm, and 435.8 nm respectively. Generally, the spherical aberration of lens system 100 is limited to a range from about −0.05 mm to about 0.05 mm, the field curvature of the lens system 100 is limited to a range from about −0.05 mm to about 0.05 mm, and the distortion of the lens system 100 is limited to a range from about −2% to about 2%.

As seen in the above-described examples, both of the spherical aberration and the field curvature of the lens system 100 can be limited to a range from about 0.05 mm to about 0.05 mm. The overall length of the lens system 100 is small, and the system 100 appropriately corrects fundamental aberrations.

While certain embodiments have been described and exemplified above, various other embodiments will be apparent to those skilled in the art from the foregoing disclosure. The present disclosure is not limited to the particular embodiments described and exemplified, and the embodiments are capable of considerable variation and modification without departure from the scope of the appended claims.

What is claimed is:

1. A lens system comprising, in order from the object side:
a positive refractive power first lens;
a positive refractive power second lens; and
a negative refractive power third lens,
wherein the lens system satisfies the following conditions:

$$(|G1R2|-G1R1)/(|G1R2|+G1R1)<0.5; \tag{1}$$

$$0.2<G1R1/F<0.6; \tag{2}$$

$$1<F1/F<1.5; \tag{3}$$

$$1<F/G3R2<7; \tag{4 and}$$

$$0.5<h/D3<0.7, \tag{5}$$

wherein, G1R1 is the radius of curvature of a surface of the first lens facing the object side of the lens system, G1R2 is the radius of curvature of the surface of the first lens facing the image side of the lens system, F is a focal length of the lens system, F1 is a focal length of the first lens, G3R2 is the radius of curvature of a surface of the third lens facing the image side of the lens system, D3 is the effective lens radius of the third lens, and h is the distance from the optical axis to a point on the image-side surface of the third lens farthest from the first lens.

2. The lens system as claimed in claim 1, wherein the following condition is satisfied: (6) −1<F*F3/V3<0, wherein, F3 is a focal length of the third lens, and V3 is the Abbe constant of the third lens.

3. The lens system as claimed in claim 1, wherein the lens system further comprises an aperture stop arranged between the first lens and the second lens.

4. The lens system as claimed in claim 3, wherein the aperture stop is formed directly on the surface of the first lens facing the image side of the lens system.

5. The lens system as claimed in claim 4, wherein the aperture stop is formed by coating a peripheral portion of the surface of the first lens using an opaque material.

6. The lens system as claimed in claim 1, wherein the lens system further comprises an infrared filter arranged between the third lens and an image plane of the lens system.

7. The lens system as claimed in claim 1, wherein the first lens is a meniscus-shaped lens with a convex surface facing the object side of the lens system.

8. The lens system as claimed in claim 1, wherein the second lens is a meniscus-shaped lens with a convex surface facing the image side of the lens system.

9. The lens system as claimed in claim 1, wherein the third lens has a convex surface facing to the object side of the lens system and a concave surface facing to the image side of the lens system.

10. The lens system as claimed in claim 1, wherein each of the first lens, the second lens, and the third lens is an aspherical lens.

11. An device with image capturing function, comprising:
a body;
a lens module mounted on the body, the lens module comprising, in order from the object side:
a positive refractive power first lens;
a positive refractive power second lens; and
a negative refractive power third lens,
wherein the lens system satisfies the following conditions:

$$(|G1R2|-G1R1)/(|G1R2|+G1R1)<0.5; \tag{1}$$

$$0.2<G1R1/F<0.6; \tag{2}$$

$$1<F1/F<1.5; \tag{3}$$

$$1<F/G3R2<7; \tag{4 and}$$

$$0.5<h/D3<0.7, \tag{5}$$

wherein, G1R1 is the radius of curvature of a surface of the first lens facing the object side of the lens system, G1R2 is the radius of curvature of the surface of the first lens facing the image side of the lens system, F is a focal length of the lens system, F1 is a focal length of the first lens, G3R2 is the radius of curvature of a surface of the third lens facing the image side of the lens system, D3 is the effective lens radius of the third lens, and h is the distance from the optical axis to a point on the image-side surface of the third lens farthest from the first lens.

12. The lens system as claimed in claim 11, wherein the following condition is satisfied: (6) $-1<F*F3/V3<0$, wherein, F3 is a focal length of the third lens, and V3 is the Abbe constant of the third lens.

13. The lens system as claimed in claim 11, wherein the lens system further comprises an aperture stop arranged between the first lens and the second lens.

14. The lens system as claimed in claim 13, wherein the aperture stop is formed directly on the surface of the first lens facing the image side of the lens system.

15. The lens system as claimed in claim 14, wherein the aperture stop is formed by coating a peripheral portion of the surface of the first lens using an opaque material.

16. The lens system as claimed in claim 11, wherein the lens system further comprises an infrared filter arranged between the third lens and an image plane of the lens system.

17. The lens system as claimed in claim 11, wherein the first lens is a meniscus-shaped lens with a convex surface facing the object side of the lens system.

18. The lens system as claimed in claim 11, wherein the second lens is a meniscus-shaped lens with a convex surface facing the image side of the lens system.

* * * * *